United States Patent
Sun

(10) Patent No.: US 10,021,263 B2
(45) Date of Patent: Jul. 10, 2018

(54) IMAGE PROCESSOR ACQUIRING IMAGE LOG, AND COMPUTER-READABLE NON-TRANSITORY RECORDING MEDIUM STORING PROGRAM FOR IMAGE PROCESSOR

(71) Applicant: KYOCERA Document Solutions Inc., Osaka (JP)

(72) Inventor: Changsong Sun, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/331,208

(22) Filed: Oct. 21, 2016

(65) Prior Publication Data
US 2017/0118366 A1    Apr. 27, 2017

(30) Foreign Application Priority Data

Oct. 27, 2015  (JP) .................. 2015-210800
Oct. 27, 2015  (JP) .................. 2015-210801

(51) Int. Cl.
*G06F 3/12* (2006.01)
*H04N 1/00* (2006.01)
*G06K 15/00* (2006.01)

(52) U.S. Cl.
CPC ..... *H04N 1/00938* (2013.01); *H04N 1/00408* (2013.01); *H04N 2201/0094* (2013.01)

(58) Field of Classification Search
None
See application file for complete search history.

(56) References Cited

U.S. PATENT DOCUMENTS

2007/0133043 A1* 6/2007 Maekawa ............... G06F 21/55
                                                    358/1.15
2012/0096465 A1* 4/2012 Kamishiro .......... G06F 11/3013
                                                    718/100

FOREIGN PATENT DOCUMENTS

JP        2007-160675 A    6/2007

* cited by examiner

*Primary Examiner* — Dov Popvici
(74) *Attorney, Agent, or Firm* — IP Business Solutions, LLC

(57) ABSTRACT

An image processor includes an image process section, an image log application, and a platform. The image process section processes an image. The image log application acquires an image log serving as a log of the image processed by the image process section. The platform operates applications including the image log application. The platform provides the image log application with an image log API for acquiring the image log, and also the image log application provides the application with a service executed by using the image log API.

4 Claims, 18 Drawing Sheets

Fig.3

27e DESTINATION INFORMATION

|  | IP ADDRESS | PORT NUMBER |
|---|---|---|
| PRIMARY | ooo.ooo.ooo.ooo | ooooo |
| SECONDARY | xxx.xxx.xxx.xxx | xxxxx |

27f IMAGE LOG GENERATION INFORMATION INITIAL VALUES

| GUARANTEE LEVEL | HIGH |
|---|---|
| RESOLUTION | 100dpi |
| PAGE RANGE | ALL |
| ⋮ | ⋮ |

27g IMAGE LOG TRANSMISSION INFORMATION INITIAL VALUES

| TRANSMISSION TIMING | AFTER JOB ENDING |
|---|---|
| . | . |
| . | . |
| . | . |

44b IMAGE LOG GENERATION INFORMATION

| GUARANTEE LEVEL | LOW |
|---|---|
| RESOLUTION | 200dpi |
| PAGE RANGE | ONLY FIRST PAGE |
| ⋮ | ⋮ |

44C IMAGE LOG TRANSMISSION INFORMATION

| TRANSMISSION TIMING | UPON LOGOUT |
|---|---|
| . | . |
| . | . |
| . | . |

IMAGE PROCESSOR ACQUIRING IMAGE LOG, AND COMPUTER-READABLE NON-TRANSITORY RECORDING MEDIUM STORING PROGRAM FOR IMAGE PROCESSOR

INCORPORATION BY REFERENCE

This application claims priority to Japanese Patent Application No. 2015-210800 filed on Oct. 27, 2015, and Japanese Patent Application No. 2015-210801 filed on Oct. 27, 2015, the entire contents of which are incorporated by reference herein.

BACKGROUND

The present disclosure relates to an image processor that acquires an image log serving as a log of an image processed by an image process section and a program for an image processor.

A typical image processor is well-known which acquires an image log serving as a log of an image processed by an image process section. In such a typical image processor, an application using an image log cannot be added.

SUMMARY

According to an aspect of the present disclosure, a technology obtained by further improving the technology described above will be suggested.

An image processor according to one aspect of the present disclosure includes an image process section, an image log application, and a platform.

The image process section processes an image.

The image log application acquires an image log serving as a log of the image processed by the image process section.

The platform operates applications including the image log application.

The platform provides the image log application with an image log API for acquiring the image log, and also the image log application provides the application with a service executed by using the image log API.

In a computer-readable non-transitory recording medium storing a program for an image processor according to another aspect of the present disclosure, the program for an image processor causes the image processor including an image process section that processes an image to function as the above-described image log application and the above-described platform.

BRIEF DESCRIPTION OF THE DRAWINGS

FIG. 3 is a diagram illustrating one example of destination information illustrated in FIG. 2.

DETAILED DESCRIPTION

Hereinafter, an image processor that acquires an image log, a computer-readable non-transitory recording medium recording a program for the image processor, and an image process method according to an embodiment as one aspect of the present disclosure will be described with reference to the drawings.

First, configuration of an image process system according to this embodiment will be described.

Figure 1:
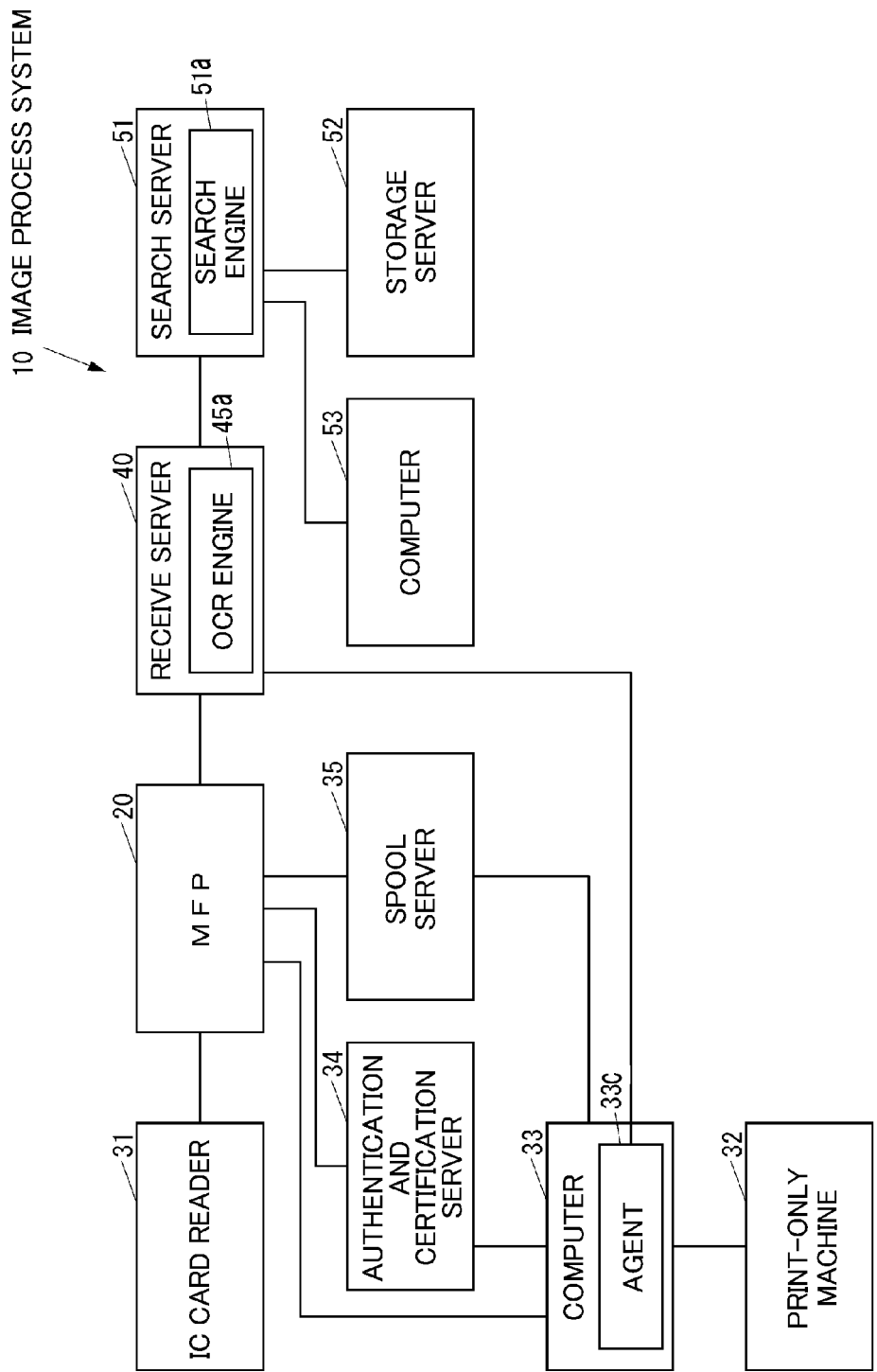
FIG. 1 is a block diagram of an image process system according to an embodiment of the present disclosure.

FIG. 1 is a block diagram of an image process system 10 according to this embodiment.

As illustrated in FIG. 1, the image process system 10 includes: a multifunction peripheral (MFP) 20 serving as an image processor that processes an image; an IC card reader 31 which is connected to the MFP 20 and which reads information from an integrated circuit (IC) card; a print-only machine 32 that executes printing as an image process; a computer 33, such as a personal computer (PC) or a smart phone, that provides the MFP 20 and the print-only machine 32 with an instruction for performing image processes; an authentication and certification server 34 serving as a computer that executes authentication and certification of a user of the MFP 20 and the computer 33; a spool server 35 serving as a computer that spools print data outputted by the computer 33; a receive server 40 serving as a computer that receives, from the MFP 20 and the computer 33, an image log indicating a history of an image processed in an image process job and a job log indicating a history of the image process job; a search server 51 serving as a computer that searches a specific keyword included in the image log and the job log; a storage server 52 serving as a computer or a network attached storage (NAS) that stores the image log and the job log; and a computer 53, such as a PC or a smart phone, that is notified from the search server 51 that security-related non-compliance has been identified.

The image log is, for example, a portable document format (PDF) file.

The job log includes identification information of a user who has executed a job. The job log is, for example, an extensible markup language (XML) file.

The MFP 20 can communicate with the computer 33, the authentication and certification server 34, the spool server 35, and the receive server 40 via the network. The computer 33 can communicate with the MFP 20, the authentication and certification server 34, the spool server 35, and the receive server 40 via the network. The search server 51 can communicate with the receive server 40, the storage server 52, and the computer 53 via the network. Note that the network described above may be any network such as a local area network (LAN) or the Internet.

Figure 2:
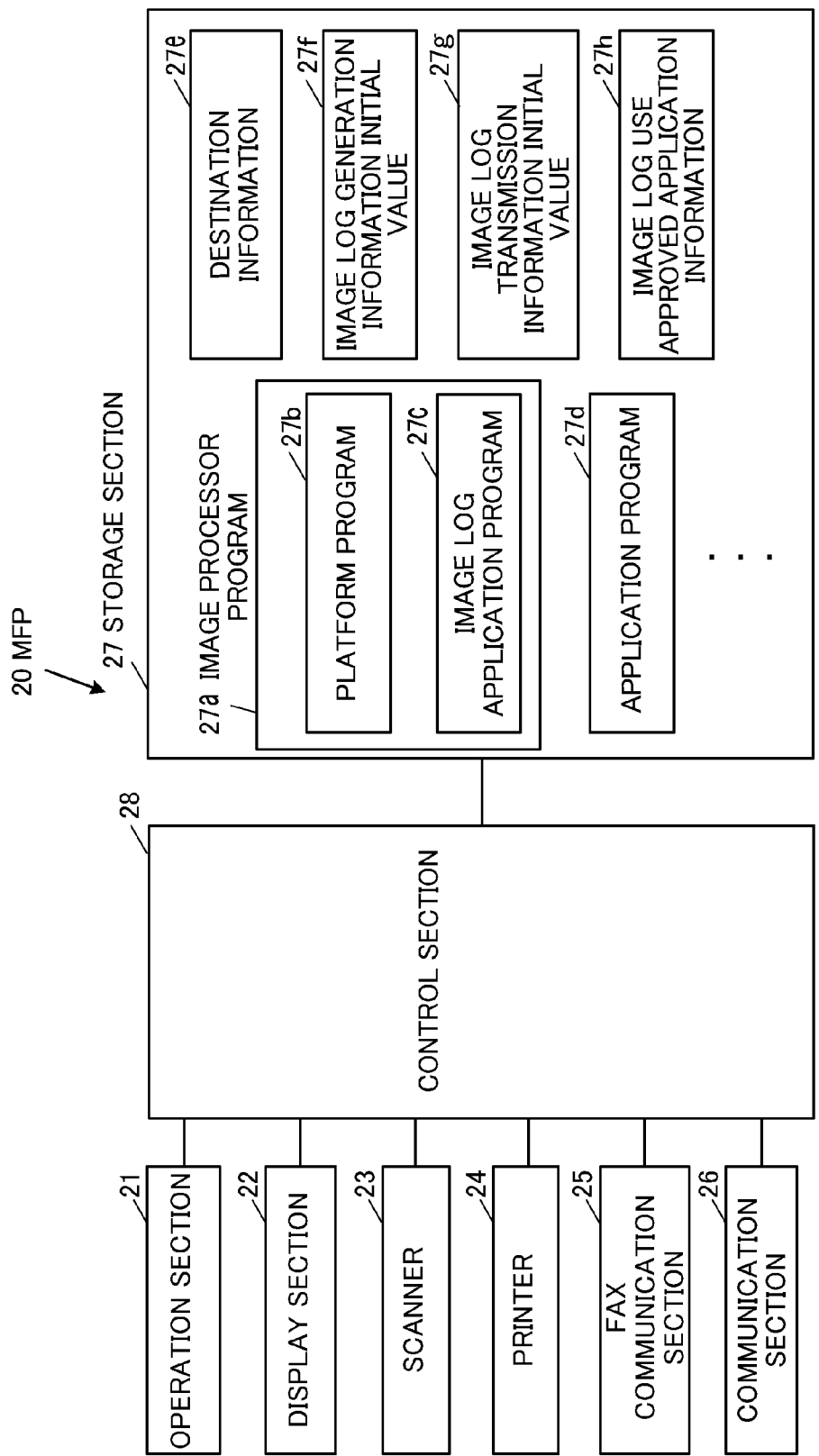
FIG. 2 is a block diagram of an MFP illustrated in FIG. 1.

FIG. 2 is a block diagram of the MFP 20.

As illustrated in FIG. 2, the MFP 20 includes: an operation section 21 serving as an input device, such as buttons, through which various operations are inputted; a display section 22 serving as a display device, such as a liquid crystal display (LCD), that displays various pieces of information; a scanner 23 serving as a reading device that reads image data from a document; a printer 24 serving as a printing device that executes printing on a recording medium such as paper; a fax communication section 25 serving as a fax device that performs fax communication with an external facsimile device, not illustrated, via a communication line such as a public phone line; a communication section 26 serving as a communication device that performs communication with an external device via the network; a storage section 27 serving as a storage device, such as a semiconductor memory or a hard disk drive (HDD), that stores various pieces of data; and a control section 28 that controls the entire MFP 20.

The scanner 23 is an image process section that executes image processes of generating image data read from a document. The printer 24 is an image process section that executes image processes of printing an image on the recording medium. The fax communication section 25 is an image process section that executes image processes of performing fax transmission of an image.

The storage section 27 stores: an image processor program 27a (a program for an image processor defined in CLAIMS) that is executed by the MFP 20; and various application programs 27d. The image processor program 27a and the application programs 27d may be installed in the MFP 20 at a stage of producing the MFP 20, may additionally be installed in the MFP 20 from a storage medium such as an SD card or a universal serial bus (USB) memory, or may additionally be installed in the MFP 20 from the network.

The image processor program 27a includes: a platform program 27b for realizing a platform; and an image log application program 27c for realizing an image log application for acquiring an image log.

The storage section 27 stores destination information 27e of the receive server 40 (see FIG. 1).

FIG. 3 is a diagram illustrating one example of the destination information 27e.

As illustrated in FIG. 3, the destination information 27e includes: an internal protocol (IP) address and a port number of a primary receive server 40; and an IP address and a port number of a secondary receive server 40 to be accessed when the primary receive server 40 cannot be accessed. In FIG. 1, only one receive server 40 is drawn, but the two receive servers 40 including the primary receive server 40 and the secondary receive server 40 can actually be provided.

As illustrated in FIG. 2, the storage section 27 stores: image log generation information initial values 27f serving as initial values of image log generation information provide for image log generation; image log transmission information initial values 27g serving as initial values of image log transmission information provided for image log transmission.

Figure 4:
FIG. 4 is a diagram illustrating one example of image log generation information initial values illustrated in FIG. 2.

FIG. 4 is a diagram illustrating one example of the image log generation information initial values 27f.

As illustrated in FIG. 4, the image log generation information initial values 27f include: for example, an initial set value of a guaranteed level indicating a level that guarantees image log generation; an initial set value of resolution of an image of an image log; and an initial set value of a page range of a plurality of pages of images which range is included in an image log in a job.

Examples of the set value of the guarantee level include: "High" that prohibits job execution when a specific storage region has no empty capacity for storing a new image log; and "Low" that, even when the specific region has no empty capacity for storing the new image, erases an old image log from the specific storage region and then generates empty capacity for the new image log to thereby achieve the job execution. For example, the initial set value of the guarantee level is "High".

Examples of the set value of the resolution include: "72 dpi", "100 dpi", "200 dpi", and "300 dpi". For example, the initial set value of the resolution is "100 dpi".

Examples of the set value of the page range include: "All" indicating that all pages of images in a job are included in an image log; "Only First Page" indicating that only the first page of image in the job is included in the image log; "First two pages from the top" indicating that only the first two pages of images from the top in the job are included in the image log; "First three pages" indicating that only the first three pages of images from the top in the job are included in the image log; "First four pages" indicating that only the first four pages of images from the top in the job are included in the image log; and "First five pages" indicating that only the first five pages of images from the top in the job are included in the image log. For example, the initial set value of the page range is "All".

Figure 5:
FIG. 5 is a diagram illustrating one example of image log transmission information initial values illustrated in FIG. 2.

FIG. 5 is a diagram illustrating one example of image log transmission information initial values 27g.

As illustrated in FIG. 5, the image log transmission information initial values 27g include, for example, an initial set value of image log transmission timing.

Examples of the set value of the transmission timing include: "After job ending" indicating that the image log transmission is performed upon each job ending; and "Upon logout" indicating that the image log transmission is performed upon logout by a user. For example, an initial set value of the transmission timing is "After job ending".

As illustrated in FIG. 2, the storage section 27 stores image log use approved application information (one example of approval information) 27h indicating an application for which use of an image log has been approved.

Figure 6:
FIG. 6 is a diagram illustrating one example of image log use approved application information illustrated in FIG. 2.

FIG. 6 is a diagram illustrating one example of the image log use approved application information 27h.

As illustrated in FIG. 6, the image log use approved application information 27h includes identification information of applications for which the use of the image log by the user has been approved.

The control section 28 illustrated in FIG. 2 includes: for example, a central processing unit (CPU), a read only memory (ROM) that stores programs and various pieces of data; a random access memory (RAM) that is used as a working region of the CPU. The CPU executes programs stored in the ROM or the storage section 27.

Figure 7:
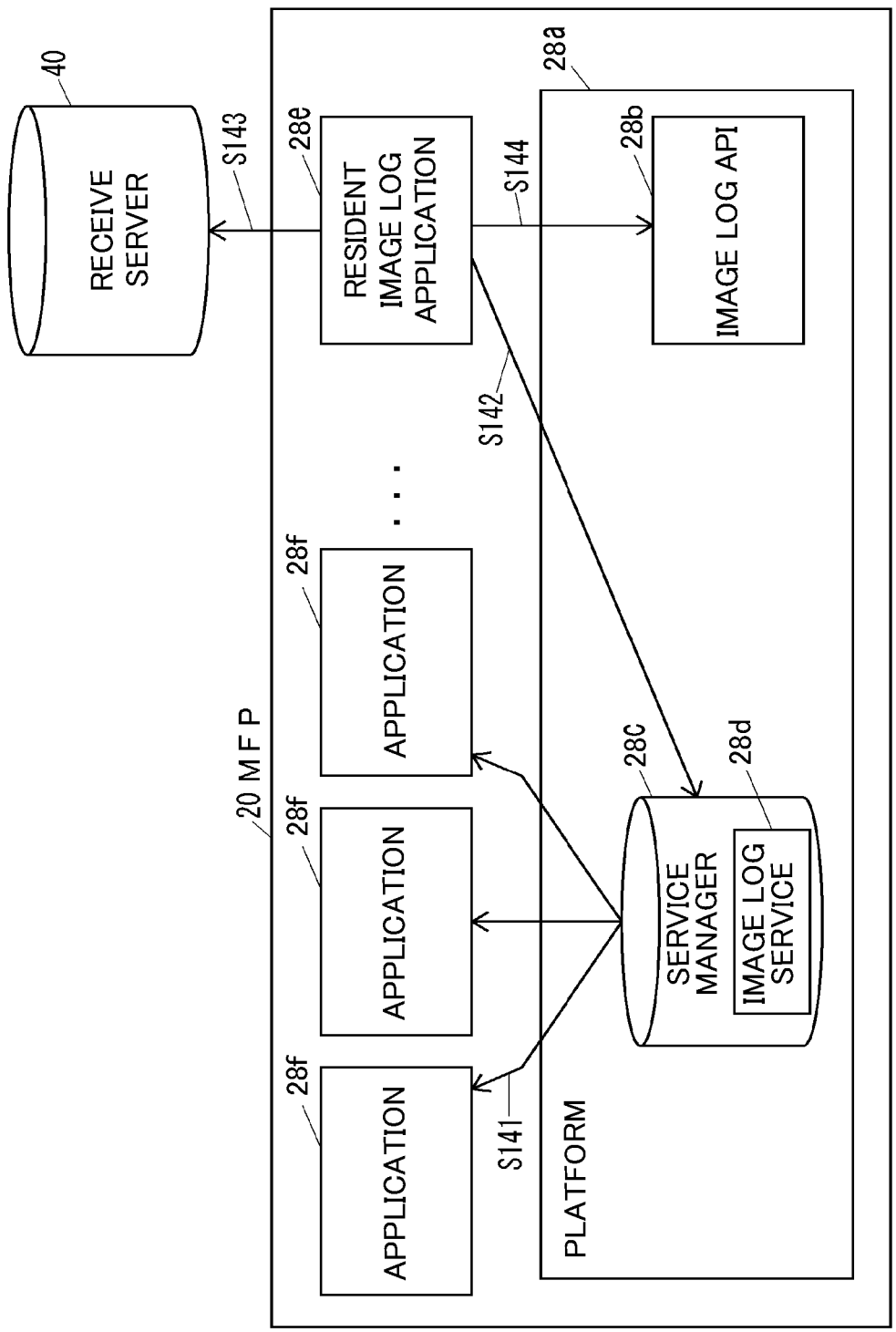
FIG. 7 is a diagram illustrating one example of functions realized by a control section illustrated in FIG. 2.

FIG. 7 is a diagram illustrating one example of functions realized by the control section 28 (see FIG. 2).

As illustrated in FIG. 7, the MFP 20 executes the platform program 27b (see FIG. 2) to thereby realize a platform 28a that functions to operate the applications. The platform 28a is, for example, a Java (registered trademark) platform.

The MFP 20 executes the image log application program 27c (see FIG. 2) to thereby realize a resident image log application 28e serving as an image log application for acquiring an image log. The resident image log application 28e is a Java application in a case where the platform 28a is the Java platform.

The MFP 20 executes the application programs 27d (see FIG. 2) to thereby realize applications 28f. The applications 28f are Java applications in a case where the platform 28a is the Java platform.

The platform 28a operates the resident image log application 28e and the applications 28f. The platform 28a provides, to the resident image log application 28e, an image log application program interface (API) 28b for acquiring an image log. Note that unless the image log API 28b is used in the image process system 10, any image log and job log cannot be acquired from the MFP 20.

The platform 28a also includes a service manager 28c by which a service provided by the resident image log application 28e is registered. The service manager 28c provides the service provided by the resident image log application 28e, that is, an image log service 28d to the applications 28f. The image log service 28d is a resident application service.

One of the applications 28f of the MFP 20 supports a user interface (UI) for setting the destination information 27e in accordance with an instruction inputted via the operation section 21 (see FIG. 2) or the communication section 26 (see FIG. 2).

Figure 8:
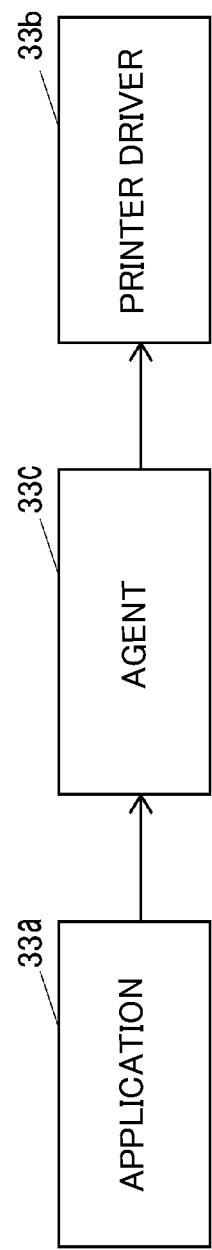
FIG. 8 is a diagram illustrating one example of functions realized by a computer illustrated in FIG. 1.

FIG. 8 is a diagram illustrating one example of functions realized by the computer 33 (see FIG. 1).

As illustrated in FIG. 8, the computer 33 realizes: an application 33a that executes various functions; a printer driver 33b that transmits print data to the MFP 20, the print-only machine 32, and the spool server 35; and an agent 33c that generates an image log and a job log to be transmitted to the receive server 40 (see FIG. 1), through execution of respective specific programs. The agent 33c lies between the application 33a and the printer driver 33b.

Figure 9:
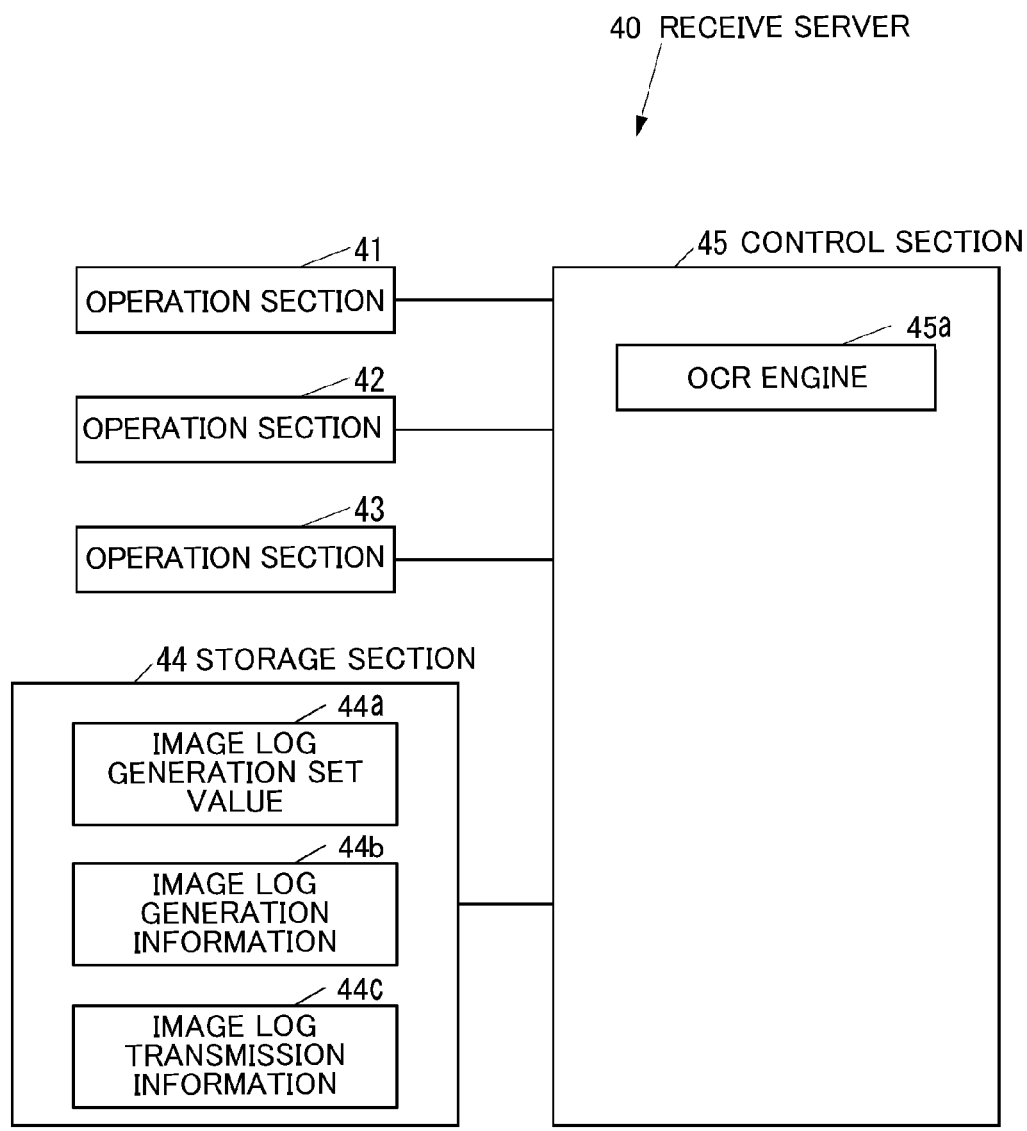
FIG. 9 is a block diagram of a receive server illustrated in FIG. 1.

FIG. 9 is a block diagram of the receive server 40.

As illustrated in FIG. 9, the receive server 40 includes: an operation section 41 serving as an input device, such as a mouse and a keyboard, through which various operations are inputted; a display section 42 serving as a display device, such as an LCD, that displays various pieces of information; a communication section 43 serving as a network communication device that performs communication with an external device via the network; a storage section 44 serving as a non-volatile storage device, such as an HDD, that stores various pieces of information; and a control section 45 that controls the entire receive server 40.

The storage section 44 stores: an image log generation set value 44a indicating whether or not to generate an image log; image log generation information 44b provided for image log generation; and image log transmission information 44c provided for image log transmission.

Here, the receive server 40 provides a Web service that permits remote reference to the image log generation set value 44a, the image log generation information 44b, and the image log transmission information 44c. Therefore, a manager can set, for example, from the computer 53, the image log generation set value 44a, the image log generation information 44b, and the image log transmission information 44c in the receive server 40.

Figure 10:
FIG. 10 is a diagram illustrating one example of image log generation information illustrated in FIG. 9.

FIG. 10 is a diagram illustrating one example of the image log generation information 44b.

As illustrated in FIG. 10, the image log generation information 44b includes: for example, a set value of a guarantee level indicating a level that guarantees image log generation; a set value of resolution of an image of the image log; and a set value of a page range of a plurality of pages of images in a job which range is included in the image log. For example, in the example illustrated in FIG. 10, "Low", "200 dpi", and "Only first page" are respectively set as the guarantee level, the resolution, and the page range.

Figure 11:
FIG. 11 is a diagram illustrating one example of image log transmission information illustrated in FIG. 9.

FIG. 11 is a diagram illustrating one example of the image log transmission information 44c.

As illustrated in FIG. 11, the image log transmission information 44c includes, for example, a set value of image log transmission timing. For example, in the example illustrated in FIG. 11, "Upon logout" is set as the transmission timing.

The control section 45 illustrated in FIG. 9 includes: for example, a CPU; a ROM storing programs and various pieces of data; and a RAM that is used as a working region of the CPU. The CPU executes programs stored in storage section 44 or the ROM.

The control section 45 executes the specific program to thereby realize an optical character recognition (OCR) engine 45a that functions to extract text data from an image included in an image log.

The search server 51 illustrated in FIG. 1 executes the specific program to thereby realize a search engine 51a that functions to search for a specific keyword included in an image log and a job log.

Next, operation performed by the image process system 10 will be described.

First, operation performed by the MFP 20 upon installation of the application program 27d will be described.

A provider of the application program 27d to be installed in the MFP 20 requests, for example, a manufacturer of the MFP 20 for use of the image log service 28d, and requests the manufacturer for issuing an approval key serving as data indicating approval of the use of the image log service 28d. Then the provider of the application program 27d includes the approval key in an installation file of the application program 27d.

Figure 12:
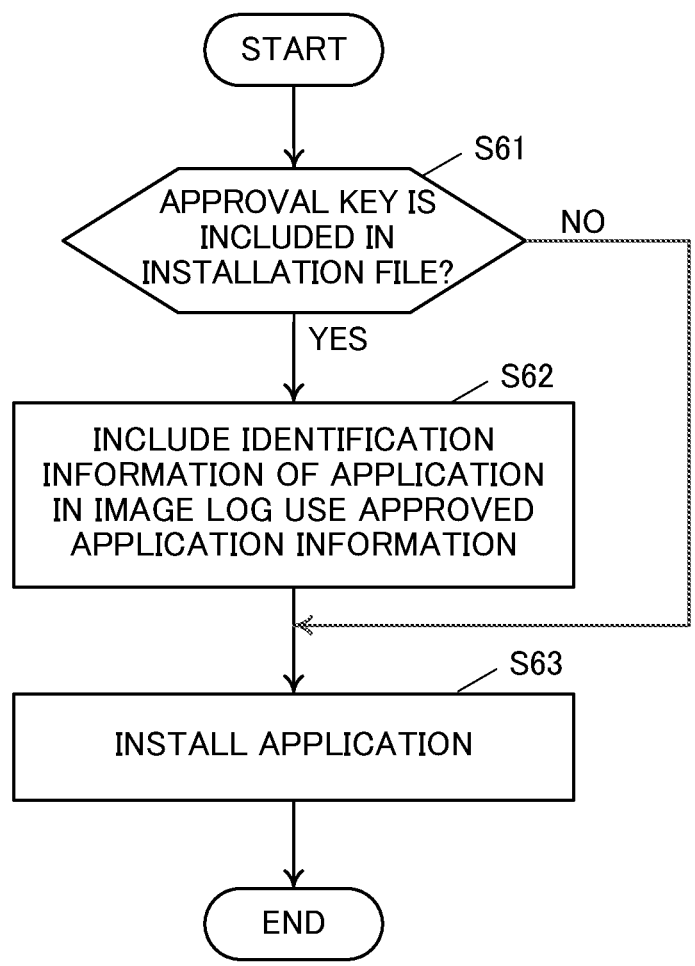
FIG. 12 is a flowchart of operation performed by the MFP illustrated in FIG. 2 upon application installation.

FIG. 12 is a flowchart of the operation performed by the MFP 20 upon the installation of the application program 27d.

As illustrated in FIG. 12, the platform 28a of the MFP 20 determines whether or not the installation file includes the approval key (S61).

Upon determination that the installation file includes the approval key, the platform 28a includes, in the image log use approved application information 27h, identification information of the application program 27d installed by the installation file, that is, the identification information of the application 28f (S62), and then installs the application program 27d by the installation file (S63), ending the operation illustrated in FIG. 12.

On the other hand, upon determination that the installation file does not include the approval key, the platform 28a installs the application program 27d by the installation file (S63), ending the operation illustrated in FIG. 12.

Here, the approval key may be fixed data not dependent on the application program 27d, or may be data generated by specific rules based on the application program 27d. In a case where the approval key is the data generated by the specific rules based on the application program 27d, the platform 28a determines in a process in S61 whether or not the installation file includes the approval key generated by the specific rules based on the application program 27d. In a case where the approval key is the data generated by the specific rules based on the application program 27d, the provider of the application program 27d is required to be approved of the use of the image log service 28d for each type of the application programs 27d by the manufacturer of the MFP 20.

Next, operation performed by the MFP 20 upon setting of the image log generation set value 44a, the image log generation information 44b, and the image log transmission information 44c via the application 28f will be described.

Figure 13:
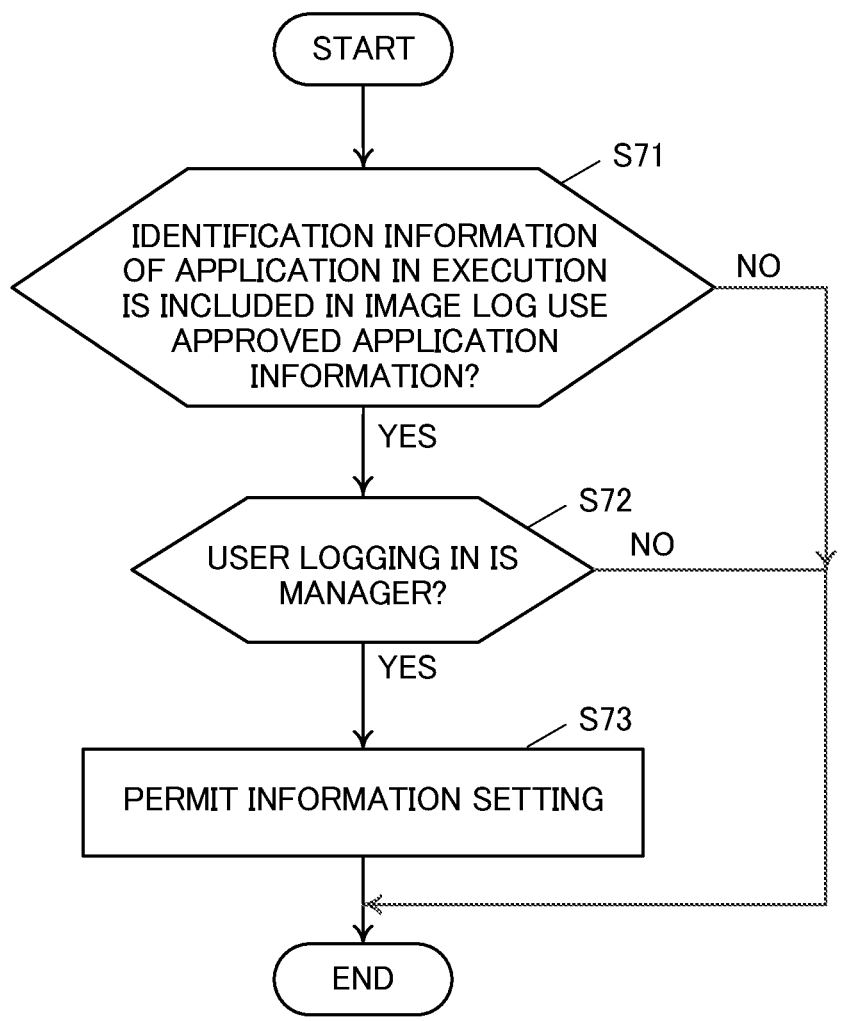
FIG. 13 is a flowchart of operation performed by the MFP illustrated in FIG. 2 upon setting of an image log generation set value, the image log generation information, and the image log transmission information via an application.

FIG. 13 is a flowchart of the operation performed by the MFP 20 upon the setting of the image log generation set value 44a, the image log generation information 44b, and the image log transmission information 44c via the application 28f.

As illustrated in FIG. 13, the platform 28a of the MFP 20 determines whether or not the identification information of the application 28f in execution is included in the image log use approved application information 27h (S71).

Upon determination in S71 that the identification information of the application 28f in execution is not included in the image log use approved application information 27h, the platform 28a ends the operation illustrated in FIG. 13. That is, the platform 28a does not permit the setting of the image log generation set value 44a, the image log generation information 44b, and the image log transmission information 44c.

Upon determination in S71 that the identification information of the application 28f in execution is included in the image log use approved application information 27h, the platform 28a determines whether or not a user logging in the MFP 20 is a manager (S72). Here, the logging in the MFP 20 is performed by using the authentication and certification server 34. Then in a case where login of a user provided with authentication by the authentication and certification server 34 is admitted, the MFP 20 can recognize, based on notification from the authentication and certification server 34, whether or not the user is the manager.

Upon determination in S72 that the user logging in the MFP 20 is not the manager, the platform 28a ends the operation illustrated in FIG. 13. That is, the platform 28a does not permit the setting of the image log generation set value 44a, the image log generation information 44b, and the image log transmission information 44c.

Upon determination in S72 that the user logging in the MFP 20 is the manager, the platform 28a permits the setting of the image log generation set value 44a, the image log generation information 44b, and the image log transmission information 44c in the receive server 40 via the application 28f in execution (S73), ending the operation illustrated in FIG. 13. Therefore, the manager logging in the MFP 20 can set the image log generation set value 44a, the image log generation information 44b, and the image log transmission information 44c in the receive server 40 via the application 28f in execution.

Note that the image log generation set value 44a, the image log generation information 44b, and the image log transmission information 44c in the receive server 40 may be settable from the MFP 20 only via the application 28f.

Moreover, the image log generation set value 44a, the image log generation information 44b, and the image log transmission information 44c in the receive server 40 may be provided for each type of the applications 28f. Then the image log generation set value 44a, the image log generation information 44b, and the image log transmission information 44c in the receive server 40 may be settable only via the corresponding application 28f.

Upon determination in S71 that the identification information of the application 28f in execution is included in the image log use approved application information 27h, without performing the determination (S72) whether or not the user logging in the MFP 20 is the manager, regardless of whether or not the user logging in the MFP 20 is the manager, the platform 28a may permit the setting of the image log generation set value 44a, the image log generation information 44b, and the image log transmission information 44c in the receive server 40 via the application 28f in execution (S73).

Next, operation performed by the image process system 10 upon image processes performed by the MFP 20 in accordance with an instruction provided via the operation section 21 of the MFP 20 will be described.

Figure 14:
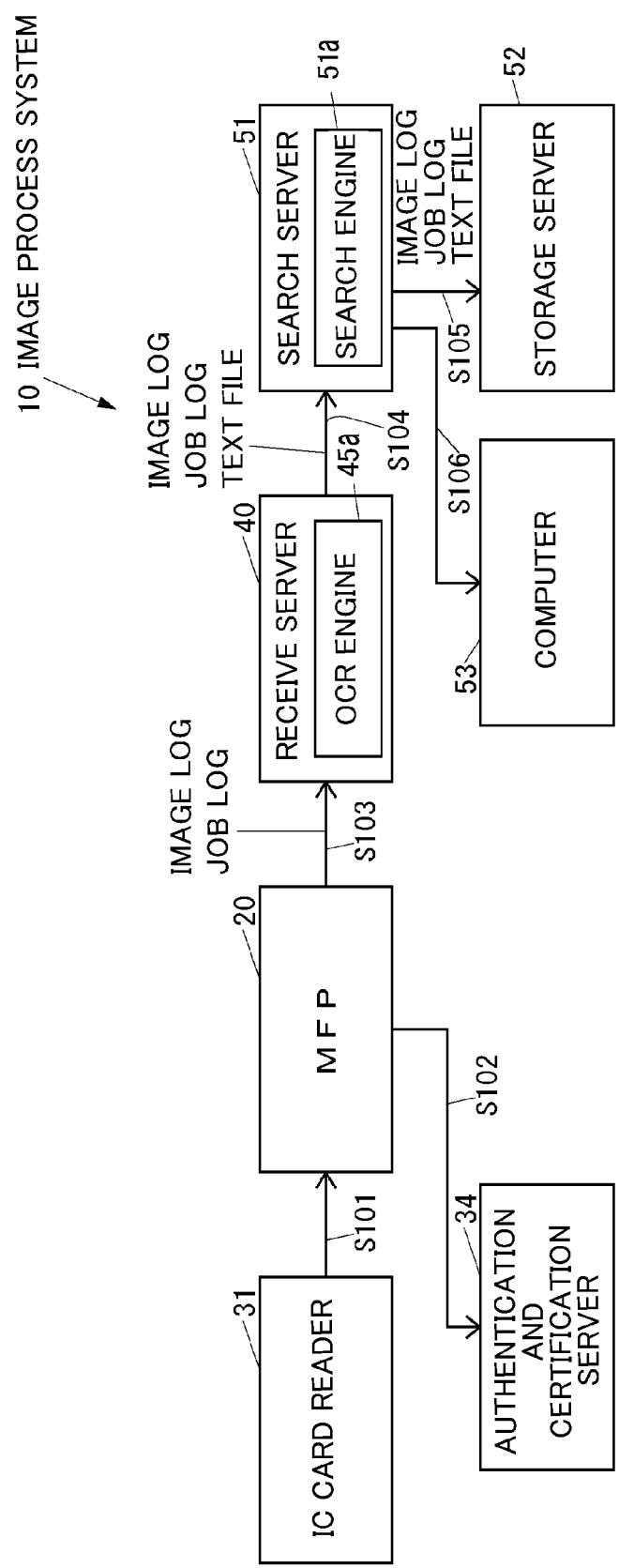
FIG. 14 is a block diagram illustrating a flow of processes performed by the image process system illustrated in FIG. 1 upon image processes performed by the MFP in accordance with an instruction provided via an operation section of the MFP.

FIG. 14 is a block diagram illustrating a flow of processes performed by the image process system 10 upon the image processes performed by the MFP 20 in accordance with the instruction provided via the operation section 21 of the MFP 20.

As illustrated in FIG. 14, when the user has caused the IC card reader 31 to read an IC card storing authentication information provided for user authentication, the control section 28 of the MFP 20 receives the authentication information read by the IC card reader 31 (S101).

Next, the control section 28 of the MFP 20 transmits the authentication information received in S101 to the authentication and certification server 34 (S102). The authentication and certification server 34 performs user authentication based on the authentication information transmitted in S102. Then upon success in the user authentication, the authentication and certification server 34 transmits, to the MFP 20, certification information of the user who has succeeded in the authentication.

When the certification information has been transmitted from the authentication and certification server 34, the control section 28 of the MFP 20 permits the user to use the functions within a range in accordance with the transmitted certification information. Therefore, the user can provide, via the operation section 21, instructions for executing the functions, such as the scan function of reading an image by the scanner 23, the copy function of printing, by the printer 24, the image read by the scanner 23, and the fax transmission function of performing fax transmission of the image read by the scanner 23 by the fax communication section 25, which all have been permitted by the control section 28, that is, instructions for performing job execution by the MFP 20. The control section 28 of the MFP 20 executes a job in accordance with an instruction provided via the operation section 21.

Then the resident image log application 28e of the MFP 20 generates an image log and a job log of the executed job, and transmits the generated image log and job log to the receive server 40 (S103). Note that the resident image log application 28*e* generates an image log in a searchable PDF format that enables text search. Note that, however, the resident image log application 28*e* may generate an image log not in the searchable PDF format but in a normal PDF format that disables the text search.

When the image log and the job log have been transmitted in S103, the OCR engine 45*a* of the receive server 40 generates a text file including a text extracted from the transmitted image log and job log, and transmits the generated text file, the image log, and the job log to the search server 51 (S104). Here, the OCR engine 45*a* transmits the image log in a searchable PDF format in S104. Note that the OCR engine 45*a* extracts a text through an OCR process from an image included in the image log received from the MFP 20, and generates an image log in a searchable PDF format based on the extracted text and the image included in the image log. Then the OCR engine 45*a* uses the generated image log in the searchable PDF format to generate a text file.

When the image log, the job log, and the text file have been transmitted in S104, the search engine 51*a* of the search server 51 searches the transmitted text file for a specific keyword, and determines how many specific keywords have been searched and on which page or pages the searched keywords are included. For example, the specific keyword is a word, for example, "Printing prohibited", preferably not included in the image log and the job log.

Then when results of the determination based on the specific keyword satisfy a specific criterion, that is, when it is determined that there is no security problem in image processes in the target job, the search engine 51*a* stores the image log, the job log, and the text file transmitted in S104 into the storage server 52 (S105).

On the other hand, when the results of the determination based on the specific keyword do not satisfy the specific criterion, that is, when there is a security problem in the image processes in the target job, the search engine 51*a* transmits, to a specific mail address, an E-mail notifying that security related non-compliance has been identified (S106). Therefore, through reception of the E-mail transmitted in S106 by, for example, the computer 53, the manager can recognize that the security related non-compliance has been identified.

Note that in the operation illustrated in FIG. 14, the authentication information is inputted from the IC card, but the authentication information may be inputted via the operation section 21.

Next, operation performed by the image process system 10 upon image processes performed by the MFP 20 in accordance with an instruction provided from the computer 33 will be described.

Figure 15:
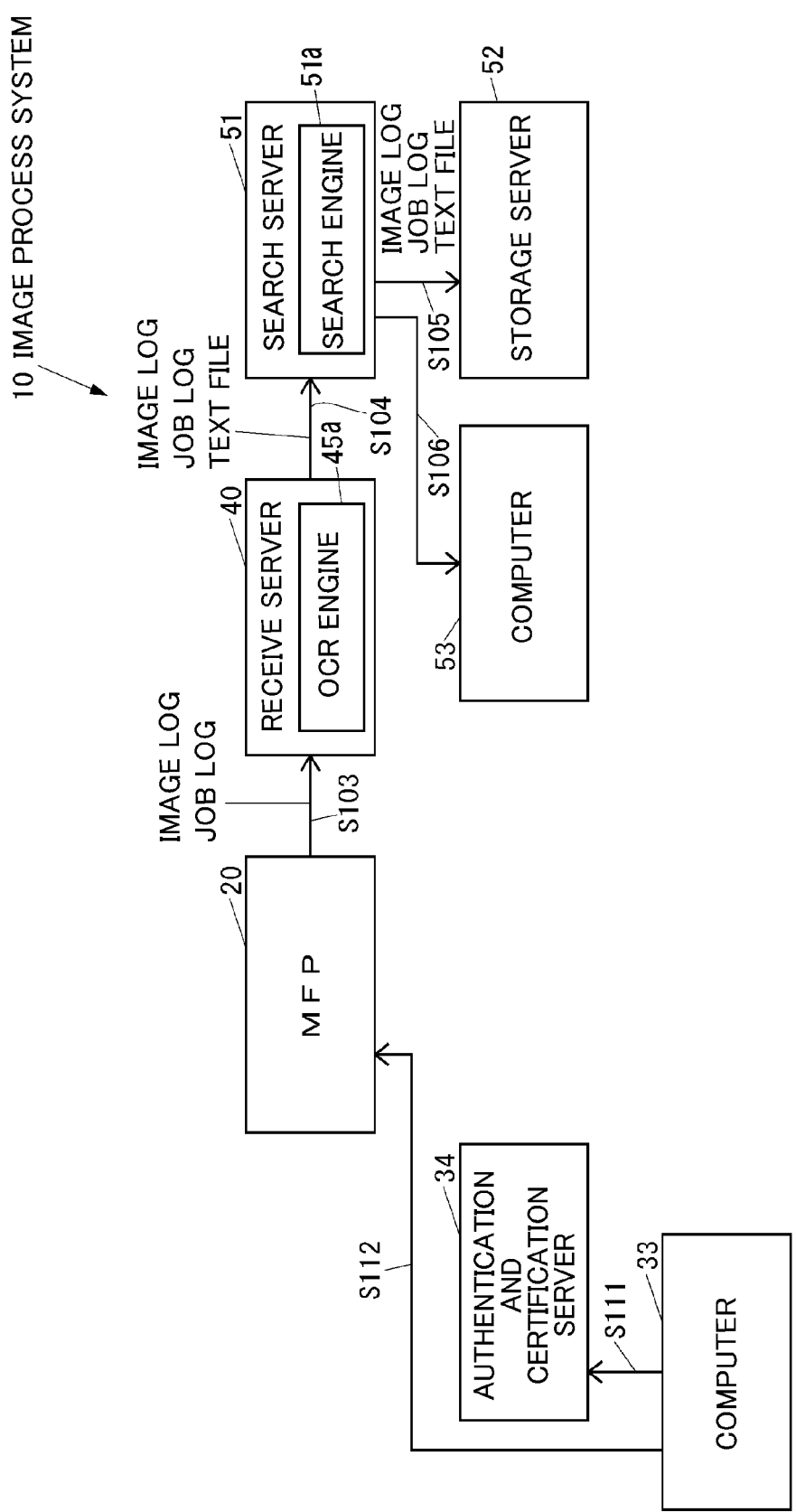
FIG. 15 is a block diagram illustrating a flow of processes performed by the image process system illustrated in FIG. 1 upon image processes performed by the MFP in accordance with an instruction provided from a computer.

FIG. 15 is a block diagram illustrating a flow of processes performed by the image process system 10 upon image processes performed by the MFP 20 in accordance with the instruction provided from the computer 33.

As illustrated in FIG. 15, when the authentication information provided for the user authentication has been inputted via the operation section, not illustrated, of the computer 33, the computer 33 transmits the inputted authentication information to the authentication and certification server 34 (S111). The authentication and certification server 34 performs user authentication based on the authentication information transmitted in S111. Then upon success in the user authentication, the authentication and certification server 34 transmits, to the computer 33, the authentication information of the user who has succeeded in the authentication.

When the authentication information has been transmitted from the authentication and certification server 34, the computer 33 permits the user to use the functions within a range in accordance with the transmitted authentication information. Therefore, the user can provide the MFP 20, via the operation section of the computer 33, with instructions for execution of the functions permitted by the computer 33, for example, the print function of performing printing by the printer 24 based on the print data received from the computer 33 and the network fax transmitting function of performing fax transmission of an image received from the computer 33 by the fax communication section 25, that is, job execution. Therefore, when the instruction for job execution by the MFP 20 has been provided via the operation section, the computer 33 provides an instruction for performing the job execution (S112). Here, in a case where the job is related to the print function, the printer driver 33*b* of the computer 33 transmits, to the MFP 20, the print data instead of the instruction for job execution.

When the instruction for job execution has been provided from the computer 33 in S112, the control section 28 of the MFP 20 executes a job in accordance with the instruction provided from the computer 33.

The processes performed thereafter are the same as the processes of S103 to S106 in the operation illustrated in FIG. 14.

Next, a description will be given on operation performed by the image process system 10 upon image processes performed by the MFP 20 in accordance with an instruction provided via the operation section 21 of the MFP 20 after transmission of the print data to the spool server 35 in accordance with an instruction provided from the computer 33.

Figure 16:
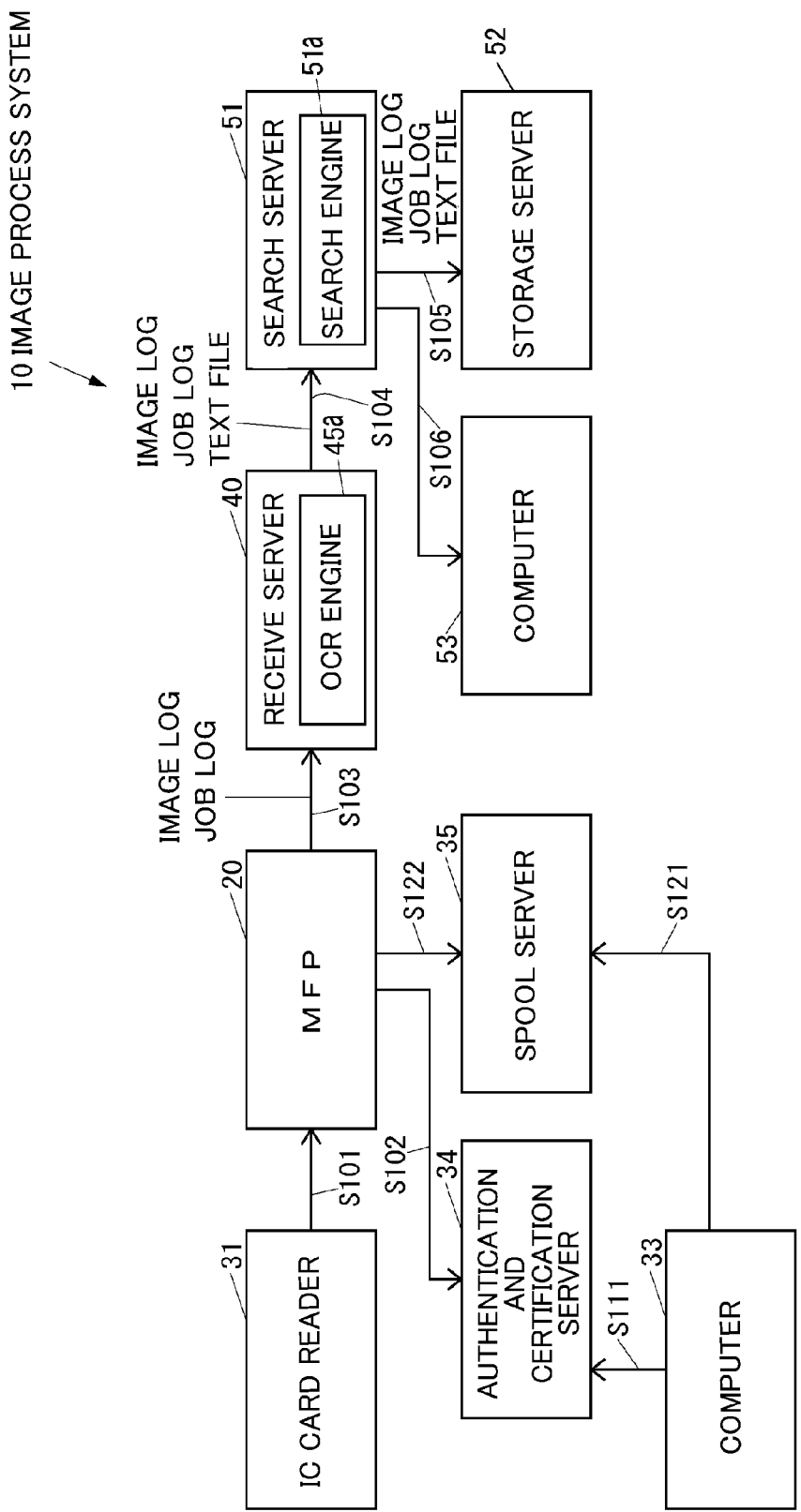
FIG. 16 is a block diagram illustrating a flow of processes performed by the image process system illustrated in FIG. 1 upon image processes performed by the MFP in accordance with an instruction provided via the operation section of the MFP after transmission of print data to a spool server by a computer in accordance with an instruction provided from the computer.

FIG. 16 is a block diagram illustrating a flow of the processes performed by the image process system 10 upon the image processes performed by the MFP 20 in accordance with the instruction provided via the operation section 21 of the MFP 20 after the transmission of the print data to the spool server 35 in accordance with the instruction provided from the computer 33.

As illustrated in FIG. 16, as is the case with the process of S111 in the operation illustrated in FIG. 15, when the computer 33 has transmitted the authentication information to the authentication and certification server 34, the authentication and certification server 34 performs user authentication based on the authentication information transmitted from the computer 33, and upon success in the user authentication, transmits, to the computer 33, certification information of the user who has succeeded in the authentication.

When the certification information has been transmitted from the authentication and certification server 34, the computer 33 permits the user to use the functions within a range in accordance with the transmitted certification information. Then when an instruction for storing the print data by the spool server 35 has been provided via the operation section, the printer driver 33*b* of the computer 33 transmits the print data together with the identification information of the user to the spool server 35 (S121).

Then when the user has caused the IC card reader 31 to read the IC card storing the authentication information of the user, the control section 28 of the MFP 20 receives the authentication information read by the IC card reader 31 (S101).

Next, the control section 28 of the MFP 20 transmits, to the authentication and certification server 34, the authentication information received in S101 (S102). The authentication and certification server 34 performs user authentication based on the authentication information transmitted in S102. Then upon success in the user authentication, the authentication and certification server 34 transmits, to the MFP 20, the certification information of the user who has succeeded in the authentication.

When the certification information has been transmitted from the authentication and certification server 34, the control section 28 of the MFP 20 permits the user to use the functions within a range in accordance with the transmitted certification information. When an instruction for executing the print data stored by the spool server 35 has been provided via the operation section 21, the control section 28 of the MFP 20 transmits the identification information of the user to the spool server 35 (S122) to thereby receive the print data of the user from the spool server 35 and execute printing based on the received print data, that is, executes the job.

Processes performed thereafter are the same as the processes of S103 to S106 in the operation illustrated in FIG. 14.

Note that in the operation illustrated in FIG. 16, the authentication information is inputted from the IC card, but may be inputted via the operation section 21.

Next, operation performed by the image process system 10 upon image processes performed by the print-only machine 32 in accordance with an instruction provided from the computer 33 will be described.

Figure 17:
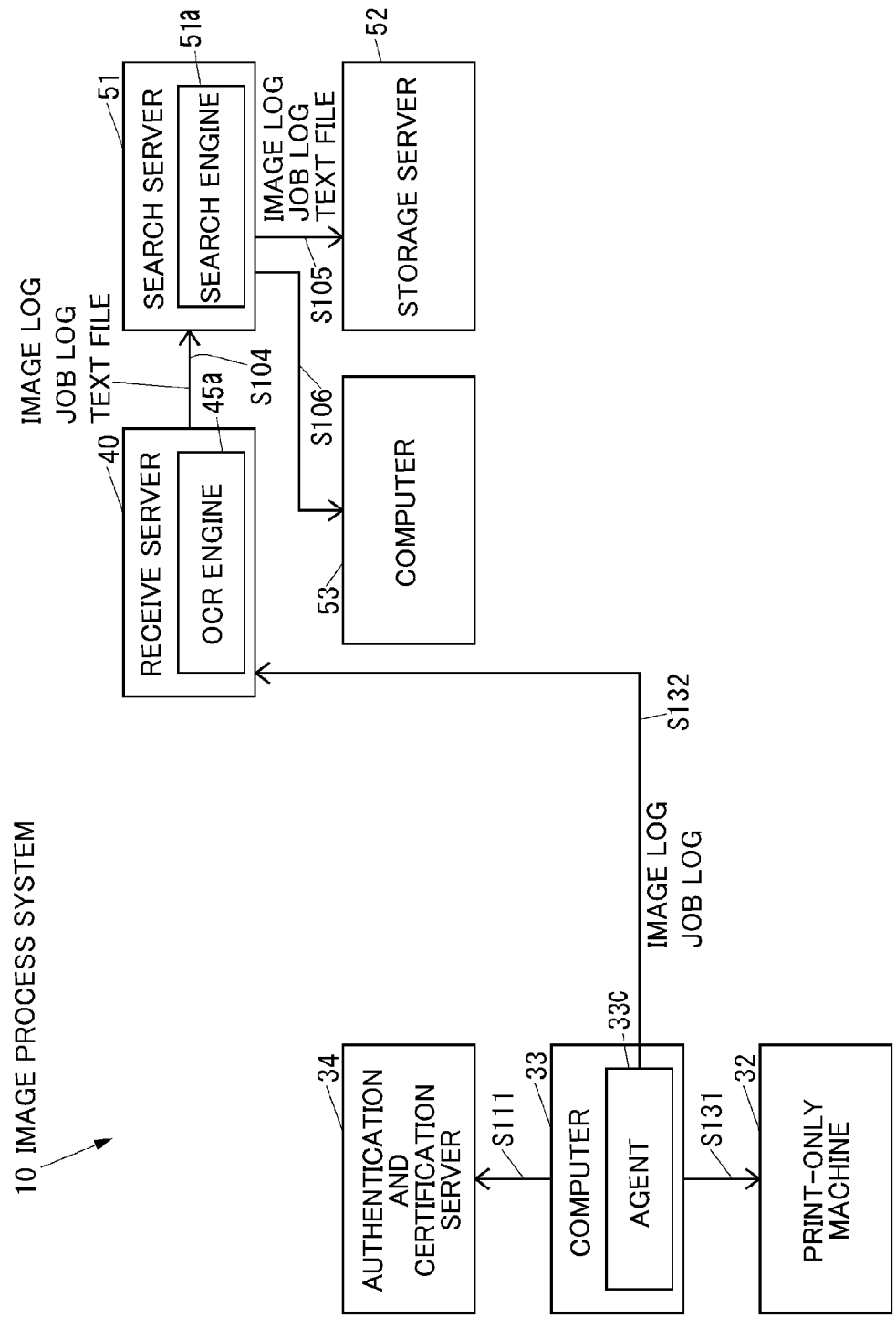
FIG. 17 is a block diagram illustrating a flow of processes performed by the image process system illustrated in FIG. 1 upon image processes performed by a print-only machine in accordance with an instruction provided from the computer.

FIG. 17 is a block diagram illustrating a flow of processes performed by the image process system 10 upon the image processes performed by the print-only machine 32 in accordance with the instruction provided from the computer 33.

As illustrated in FIG. 17, as is the case with the process of S111 in the operation illustrated in FIG. 15, when the computer 33 has transmitted the authentication information to the authentication and certification server 34, the authentication and certification server 34 performs user authentication based on the authentication information transmitted from the computer 33, and upon success in the user authentication, transmits, to the computer 33, the certification information of the user who has succeed in the authentication.

When the certification information has been transmitted from the authentication and certification server 34, the computer 33 permits the user to use the functions within a range in accordance with the transmitted certification information. Then when an instruction for executing a print job by the print-only machine 32 has been provided via the operation section, the printer driver 33b of the computer 33 transmits the print data to the print-only machine 32 (S131).

When the print data has been transmitted from the computer 33 in S131, the print-only machine 32 executes printing in accordance with the print data transmitted from the computer 33.

Next, the agent 33c of the computer 33 generates an image log and a job log of the executed print job, and transmits the generated image log and job log to the receive server 40 (S132).

The processes performed thereafter are the same the processes of S104 to S106 in the operation illustrated in FIG. 14.

Next, the processes of S103 in FIGS. 14 to 16 will be described in detail.

When an instruction for job execution by the MFP 20 has been provided via the operation section 21 of the MFP 20 or the computer 33, the application 28f corresponding to the aforementioned job, after the job execution, uses the image log service 28d provided by the service manager 28c, as illustrated in FIG. 7 (S141).

Figure 18:
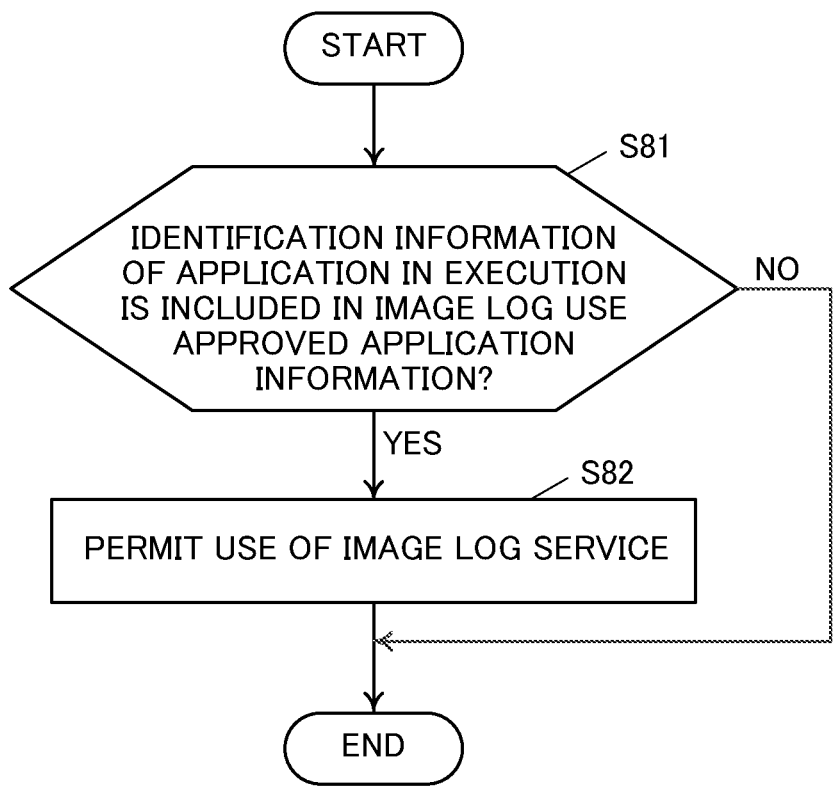
FIG. 18 is a flowchart of operation performed by the MFP illustrated in FIG. 2 upon use of an image log service.

FIG. 18 is a flowchart of operation performed by the MFP 20 upon use of the image log service 28d.

As illustrated in FIG. 18, the platform 28a of the MFP 20 determines whether or not the identification information of the application 28f is included in the image log use approved application information 27h (S81).

Upon determination in S81 that the identification information of the application 28f in execution is not included in the image log use approved application information 27h, the platform 28a ends the operation illustrated in FIG. 18. That is, the platform 28a does not permit use of the image log service 28d.

Upon judgment in S81 that the identification information of the application 28f in execution is included in the image log use approved application information 27h, the platform 28a permits use of the image log service 28d via the application 28f in execution (S82), ending the operation illustrated in FIG. 18.

As illustrated in FIG. 7, upon use of the image log service 28d, which has been provided by the service manager 28c, by the application 28f (S141), the resident image log application 28e is executed (S142).

Then after reading out the destination information 27e of the receive server 40 from the storage section 27, the resident image log application 28e uses the destination information 27e to acquire various set values from the receive server 40 (S143). Specifically, in the process of S143, the resident image log application 28e acquires the image log generation set value 44a, the image log generation information 44b, and the image log transmission information 44c from the receive server 40, and manages them as an image log generation set value, image log generation information, and image log transmission information on the RAM of the control section 28. In a case where the image log generation set value 44a, the image log generation information 44b, and the image log transmission information 44c in the receive server 40 are provided for each type of the applications 28f, the resident image log application 28e may acquire the image log generation set value 44a, the image log generation information 44b, and the image log transmission information 44c corresponding to the application 28f in execution from the receive server 40.

Here, upon failure in the acquisition of the image log generation information 44b and the image log transmission information 44c, the resident image log application 28e displays an error screen at the display section 22 or a display section of the computer 33. When an instruction for desiring to continue the operation has been inputted to the operation section 21 or the operation section of the computer 33, the resident image log application 28e acquires the image log generation information initial value 27f and the image log transmission information initial value 27g from the storage section 27, and manages them as image log generation information and image log transmission information respectively on the RAM of the control section 28.

When it has been set for the image log generation set value 44a that no image log is to be generated, the resident image log application 28e does not execute processes of image log generation and transmission to be described later on but executes only job log generation and transmission.

After the process of S143, the resident image log application 28e uses the image log API 28b to acquire an image log and a job log (S144). Here, the resident image log application 28e acquires the image log in accordance with the image log generation information acquired in S143. The resident image log application 28e may cause the image log API 28b to generate the image log in accordance with the image log generation information acquired in S143 to thereby acquire an image log in accordance with the image log generation information acquired in S143. The resident image log application 28e may also change, in accordance with the image log generation information acquired in S143, the image log generated by the image log API 28b to thereby acquire the image log in accordance with the image log generation information acquired in S143.

After the process of S144, the resident image log application 28e generates a log file obtained by collectively encoding the image log and the job log acquired in S144, and transmits the generated log file to the receive server 40 in accordance with the image log transmission information acquired in 143. Upon failure in the log file transmission to the receive server 40, the resident image log application 28e temporarily stores, in the storage section 27, the log file transmitted in failure, and upon transmission of another log file generated thereafter, also transmits the log file in the storage section 27. The receive server 40 provides a Web service for log file reception, and thus can transmit the log file transmitted from the MFP 20. Upon reception of the log file from the MFP 20, the receive server 40 decodes the received log file to acquire an image log and a job log. Note that, in the above description, the resident image log application 28e transmits, to the receive server 40, the log file obtained by collectively encoding the image log and the job log but may transmits the image log and the job log to the receive server 40 without encoding the image log and the job log.

As described above, the MFP 20 provides the image log service 28d provided by the resident image log application 28e to the application 28f, which can therefore make it easy to add the application 28f using an image log.

The platform 28a permits use of the image log service 28d by the application 28f based on information of approval of use of the image log service 28d, that is, the image log use approved application information 27h (S81 to S82). Specifically, the MFP 20 limits use of a service by the resident image log application 28e, that is, use of the image log service 28d by the application 28f on an individual application 28f basis. Therefore, the MFP 20 can suppress security deterioration resulting from addition of the application 28f using an image log.

Moreover, the MFP 20, by not disclosing the image log API 28b itself to the application 28f, the image log API 28b cannot directly be used from the application 28f, which can therefore suppress the security deterioration resulting from the addition of the application 28f using an image log.

The MFP 20 provides the image log API 28b as the image log service 28d to the application 28f, and thus use of the image log service 28d by the application 28f can be limited to thereby limit use of the image log API 28b by the application 28f. For example, the use of the image log service 28d can be limited based on the identification information of the user who executes the application 28f or in accordance with a function, such as copying or scanning, executed through the execution of the application 28f. Therefore, the MFP 20 can suppress the security deterioration resulting from the addition of the application 28f using an image log.

The platform 28a permits changing, via the application 28f, set values of the image log service 28d, that is, changing the image log generation set value 44a, the image log generation information 44b, and the image log transmission information 44c based on the image log use approved application information 27h (S71 to S73). That is, the platform 28a of the MFP 20 can limit changing, via the application 28f, the set values of the image log generation set value 44a, the image log generation information 44b, and the image log transmission information 44c for each application 28f, and thus can suppress the security deterioration resulting from the addition of the application 28f using an image log.

The MFP 20 automatically sets the image log use approved application information 27h through the installation of the application 28f (S61 to S63), which can therefore suppress the security deterioration resulting from the addition of the application 28f using an image log.

In this embodiment, upon every execution of an image process job, the MFP 20 acquires the image log generation set value 44a, the image log generation information 44b, and the image log transmission information 44c from the receive server 40 (S143). However, the MFP 20 may acquire the image log generation set value 44a, the image log generation information 44b, and the image log transmission information 44c from the receive server 40 at different timing, for example, upon automatic activation of the MFP 20 itself or upon login by a user. In the MFP 20, with higher frequency of acquiring the image log generation set value 44a, the image log generation information 44b, and the image log transmission information 44c, changes in the values of the image log generation set value 44a, the image log generation information 44b, and the image log transmission information 44c can appropriately be reflected with higher possibility.

In a typical image processor, an application using an image log cannot be added. The image log includes an image itself that has been processed by the image process section. Thus, in a typical image processor, upon misuse of an image log function, information such as individual information of a job executor and important business information easily flow out. Therefore upon addition of an application using an image log to the image processor, it is required to suppress security deterioration in the processor. On the contrary, with the embodiment described above, the addition of the application using an image log is simplified, and the security deterioration resulting from the addition of the application using an image log can be suppressed.

The image processor of the present disclosure is an MFP in this embodiment, but may be an image processor, other than the MFP, such as the print-only machine, a copy-only machine, a scanner-print machine, or a fax-only machine.

Various modifications and alterations of the present disclosure will be apparent to those skilled in the art without departing from the scope and spirit of the present disclosure, and it should be understood that the present disclosure is not limited to the illustrative embodiments set forth herein.

What is claimed is:

1. A multifunction peripheral (MFP) serving as an image processor that processes an image, the MFP comprising:
 a control section including at least a central processing unit (CPU); and
 a storage device, including at least one of a semiconductor memory and a hard disk drive (HDD), that stores: (i) a platform program; (ii) an image log application program; (iii) a plurality of application programs; (iv) an initial value of image log generation information; (v) an initial value of image log transmission information; and (vi) an image log use approved application information, wherein:

the image log generation information includes: (i) a guaranteed level indicating a level that guarantees generation of an image log; (ii) a resolution of an image of the image log; and (iii) a page range of a plurality of pages of images of the image log in a job; and the image log transmission information includes a transmission timing of the image log, wherein:

the MFP executes the image log application program to thereby realize an image log application that acquires the image log;

the MFP executes the plurality of application programs to thereby realize a plurality of applications;

the MFP executes the platform program to thereby realize a platform that operates the plurality of applications and the image log application; and the platform (i) provides an image log application program interface (API) for acquiring the image log to the image log application, and (ii) includes a service manager that provides an image log service by the image log application to the plurality of applications, and wherein:

the platform, when determining an installation file including an approval key having data that approves to use the image log service, (i) includes identification information of the application program in the image log use approved application information, and (ii) installs the application program by the installation file; and the platform, (i) when determining the identification information of a specified application among the plurality of applications is not included in the image log use approved application information, does not permit the specified application to set a value of the image log generation information and a value of the image log transmission information, and (ii) when determining the identification information of the specified application is included in the image log use approved application information, permits the specified application to set the value of the image log generation information and the value of the image log transmission information.

2. The image processor according to claim 1, wherein:

the platform, when determining the identification information of the specified application is included in the image log use approved application information, further determines whether or not the user who logs in the image processor is a manager; and the platform, (i) when determining the user who logs in the image processor is not the manager, does not permit the specified application to set the value of the image log generation information and the value of the image log transmission information, and (ii) when determining the user who logs in the image processor is a manager, permits the specified application to set the value of the image log generation information and the value of the image log transmission information.

3. A computer-readable non-transitory recording medium storing a computer program for a multifunction peripheral (MFP) serving as an image processor that processes an image and includes a storage device as at least one of a semiconductor memory and a hard disk drive (HDD), wherein:

the storage device stores: (i) a platform program; (ii) an image log application program; (iii) a plurality of application programs; (iv) an initial value of image log generation information; (v) an initial value of image log transmission information; and (vi) image log use approved application information;

the image log generation information includes: (i) a guaranteed level indicating a level that guarantees generation of an image log; (ii) a resolution of an image of the image log; and (iii) a page range of a plurality of pages of images of the image log in a job; and the image log transmission information includes a transmission timing of the image log, the computer program causing the image processor to realize:

an image log application that acquires an image log;

a plurality of applications; and a platform that operates the plurality of applications and the image log application, wherein:

the platform (i) provides an image log application program interface (API) for acquiring the image log to the image log application, and (ii) includes a service manager that provides an image log service by the image log application to the plurality of applications, and wherein:

the platform, when determining an installation file including an approval key having data that approves to use the image log service, (i) includes identification information of the application program in the image log use approved application information, and (ii) installs the application program by the installation file; and the platform (i) when determining the identification information of a specified application among the plurality of applications is not included in the image log use approved application information, does not permit the specified application to set a value of the image log generation information and a value of the image log transmission information, and (ii) when determining the identification information of the specified application is included in the image log use approved application information, permits the specified application to set the value of the image log generation information and the value of the image log transmission information.

4. The computer-readable non-transitory recording medium storing the program for the image processor according to claim 3, wherein:

the platform, when determining the identification information of the specified application is included in the image log use approved application information, further determines whether or not the user who logs in the image processor is a manager; and the platform (i) when determining the user who logs in the image processor is not the manager, does not permit the specified application to set the value of the image log generation information and the value of the image log transmission information, and (ii) when determining the user who logs in the image processor is a manager, permits the specified application to set the value of the image log generation information and the value of the image log transmission information.

* * * * *